(12) United States Patent
Fairman et al.

(10) Patent No.: US 6,453,376 B1
(45) Date of Patent: Sep. 17, 2002

(54) METHOD FOR IMPLEMENTING SCHEDULING MECHANISMS WITH SELECTABLE RESOURCE MODES

(75) Inventors: Bruce A. Fairman, Woodside; Scott D. Smyers; Harold A. Ludtke, both of San Jose; Glen D. Stone, Campbell, all of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/521,334

(22) Filed: Mar. 9, 2000

Related U.S. Application Data

(60) Provisional application No. 60/161,206, filed on Oct. 21, 1999, and provisional application No. 60/160,991, filed on Oct. 21, 1999.

(51) Int. Cl.[7] .......................... G06F 12/00; G06F 13/14
(52) U.S. Cl. ................. 710/240; 710/107; 710/113; 710/119; 709/223; 709/224; 709/226
(58) Field of Search ................. 709/226, 223, 709/224; 710/107, 113, 119, 240

(56) References Cited

U.S. PATENT DOCUMENTS

| | | | | |
|---|---|---|---|---|
| 5,671,225 A | * | 9/1997 | Hooper et al. | 370/468 |
| 5,734,909 A | * | 3/1998 | Bennett | 710/200 |
| 5,774,660 A | * | 6/1998 | Brendel et al. | 709/201 |
| 5,774,668 A | * | 6/1998 | Choquier et al. | 709/105 |
| 5,905,522 A | * | 5/1999 | Lawler | 348/7 |
| 5,961,585 A | | 10/1999 | Hamlin | 709/108 |
| 6,038,234 A | * | 3/2000 | LaFollette et al. | 370/443 |
| 6,057,832 A | * | 5/2000 | Lev et al. | 345/327 |
| 6,067,580 A | * | 5/2000 | Aman et al. | 709/330 |
| 6,112,243 A | * | 8/2000 | Downs et al. | 709/226 |
| 6,256,390 B1 | * | 7/2001 | Okuyama et al. | 380/201 |

OTHER PUBLICATIONS

Jones M.B. "Adaptive Real–Time Resource Management Supporting Modular Composition Of Digital Multimedia Services", Mar. 11, 1993, pp. 21–28, XP000725303.

* cited by examiner

*Primary Examiner*—Rupal Dharia
(74) *Attorney, Agent, or Firm*—Gregory J. Koerner; Simon & Koerner LLP

(57) ABSTRACT

A method for implementing scheduling mechanisms with selectable resource modes comprises at least one resource characterization set that includes a plurality of resource characterizations that each have resource requirements for executing a requested process. The plurality of resource characterizations may include a most mode, a best mode, and a worst mode. An allocation manager may then select a resource mode, and compare the corresponding resource requirements for the requested process to the currently-available device resources. The allocation manager may then authorize or deny the requested process depending upon whether the currently-available resources are sufficient to adequately service the resource requirements of the requested process.

34 Claims, 8 Drawing Sheets

METHOD FOR IMPLEMENTING SCHEDULING MECHANISMS WITH SELECTABLE RESOURCE MODES

CROSS-REFERENCE TO RELATED APPLICATIONS

This application is related to, and claims priority in, co-pending U.S. Provisional Patent Application Serial No. 60/161,206, entitled "Method For Implementing Scheduling Mechanisms By Utilizing Resource Characterizations," filed on Oct. 21, 1999, and to U.S. Provisional Patent Application Ser. No. 60/160,991, entitled "Method For Quantifying Available System Resources Associated With A Hardware Component," filed on Oct. 21, 1999. All of these related applications are commonly assigned, and are hereby incorporated by reference.

BACKGROUND SECTION

1. Field of the Invention

This invention relates generally to techniques for implementing electronic devices, and relates more particularly to a method for implementing scheduling mechanisms with selectable resource modes.

2. Description of the Background Art

Implementing effective methods for utilizing device resources is a significant consideration for designers and manufacturers of contemporary electronic devices. However, effectively utilizing device resources may create substantial challenges for designers of electronic devices. For example, enhanced demands for increased device functionality and performance may require more system processing power, bus bandwidth, and require additional hardware resources. An increase in processing or hardware requirements may also result in a corresponding detrimental economic impact due to increased production costs and operational inefficiencies.

An electronic device in an electronic network may advantageously communicate with other electronic devices in the network to share resources to thereby substantially increase the capabilities and versatility of individual devices in the electronic network. For example, an electronic network may be implemented in a home environment to enable flexible and beneficial sharing of data and device resources between various consumer electronic devices, such as personal computers, digital video disc (DVD) devices, digital set-top boxes for digital broadcasting, enhanced television sets, and audio reproduction systems.

Network size is also a factor that affects the management of resources in an electronic network. Communications in an electronic network typically become more complex as the number of individual devices or nodes increases. A local software module on the local device may need to communicate with various remote software elements on remote devices across the electronic network. However, successfully managing resources of a substantial number of electronic devices across a network may provide significant benefits to a system user.

Furthermore, enhanced device capability to perform various advanced processes may provide additional benefits to a system user, but may also place increased demands on the control and management of an electronic device. For example, an enhanced electronic device that effectively accesses, processes, and displays digital television programming may benefit from efficient use of resources because of the large amount and complexity of the digital data involved.

Due to growing demands on system resources and substantially increasing data magnitudes, it is apparent that developing new and effective methods for managing resources is a matter of importance for the related electronic technologies. Therefore, for all the foregoing reasons, implementing effective methods for utilizing resources remains a significant consideration for designers, manufacturers, and users of contemporary electronic devices.

SUMMARY

In accordance with the present invention, a method is disclosed for effectively implementing scheduling mechanisms with selectable resource modes. In one embodiment of the present invention, initially, device software preferably generates an isochronous process request to a cantaloupe manager that functions as a resource allocation manager for the electronic device. In response, the cantaloupe manager preferably accesses a resource characterization set that includes resource usages or resource requirements that are listed in one or more resource characterizations known as "cantaloupes". The resource usages in an accessed cantaloupe set preferably correspond to the foregoing isochronous process that was initially requested by the device software.

In certain embodiments, the device software may specify a resource usage mode as part of the isochronous process request to select a particular cantaloupe from the cantaloupe set. The cantaloupe set therefore advantageously provides resource characterizations that are dynamically selectable depending upon design considerations and current conditions in the electronic device.

The cantaloupe manager then preferably may compare the resource usages from the selected resource usage mode with currently-available resources of the electronic device. If sufficient available resources are present for performance of the requested isochronous process, then the cantaloupe manager preferably authorizes the device software to instantiate the requested process through a picokernel module. However, if sufficient currently-available resources are not present for execution of the requested isochronous process, then the cantaloupe manager may generate a request-fail signal to the device software to thereby deny the request to instantiate the isochronous process.

In certain embodiments, the cantaloupe manager may access the cantaloupe set to perform a hierarchical examination process to thereby encourage optimal performance while still attempting to permit authorization of the requested isochronous process. For example, in one embodiment, the cantaloupe manger may initially evaluate a most mode from the cantaloupe set. In the event that sufficient currently-available resources are not present to successfully execute the most mode, the cantaloupe manager may then preferably evaluate a best mode from the cantaloupe set.

Again, if sufficient currently-available resources are not present to successfully execute the best mode, then the cantaloupe manager preferably may evaluate a worst mode. In the event that sufficient currently-available resources are still not present to successfully execute the worst mode, then the cantaloupe manager preferably generates a request fail signal to the device software to thereby deny authorization of the requested isochronous process.

In this manner, the present invention advantageously and selectively pre-allocates sufficient guaranteed resources for a given isochronous process, prior to instantiation, to thereby guarantee successful and deterministic performance of the requested isochronous process. The present invention therefore provides an effective method for implementing scheduling mechanisms with selectable resource modes.

DETAILED DESCRIPTION

The present invention relates to an improvement in electronic devices. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

A method is herein disclosed for implementing scheduling mechanisms with selectable resource modes. The method preferably comprises at least one resource characterization set that includes a plurality of resource characterizations that each have resource requirements for executing a requested process. The plurality of resource characterizations preferably may include a most mode, a best mode, and a worst mode. An allocation manager may then select a resource mode, and compare the corresponding resource requirements for the requested process to the currently-available device resources. The allocation manager may then authorize or deny the requested process depending upon whether the currently-available resources are sufficient to adequately service the resource requirements of the requested process.

Figure 1:
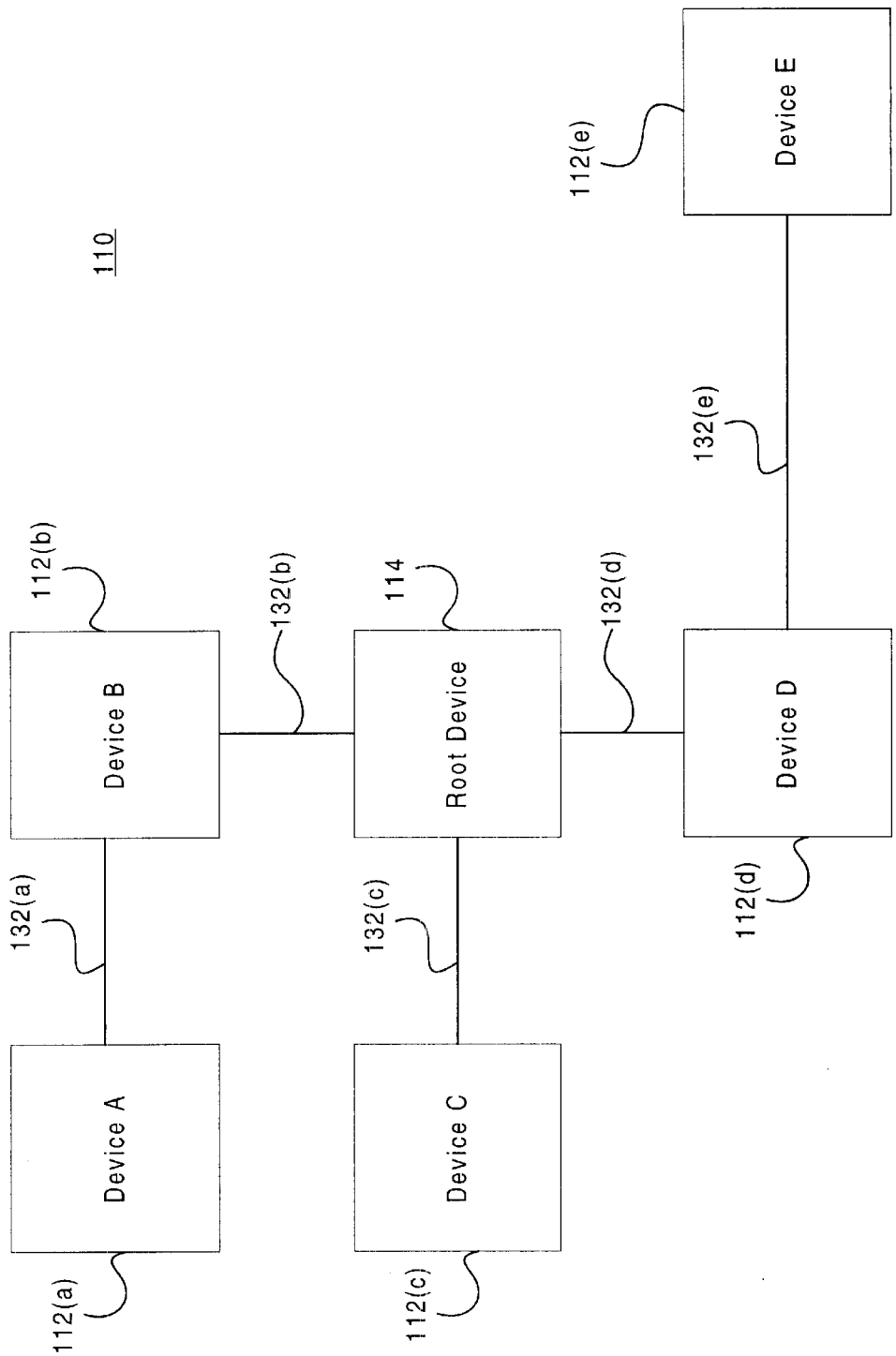
FIG. 1 is a block diagram for one embodiment of an electronic network, in accordance with the present invention.

Referring now to FIG. 1, a block diagram for one embodiment of an electronic network 110 is shown, in accordance with the present invention. In the FIG. 1 embodiment, network 110 preferably comprises, but is not limited to, a number of electronic devices 112 (device A 112(a), device B 112(b), root device 114, device C 112(c), device D 112(d), and device E 112(e)). In alternate embodiments, electronic network 110 may readily be configured to include various other devices or components that function in addition to, or instead of, those discussed in conjunction with the FIG. 1 embodiment. In alternate embodiments, network 110 may readily be connected and configured in any other appropriate and suitable manner.

In the FIG. 1 embodiment, devices 112 of network 110 may be implemented as any type of electronic device, including, but not limited to, personal computers, printers, digital video disc devices, television sets, audio systems, video cassette recorders, and set-top boxes for digital broadcasting. In the FIG. 1 embodiment, devices 112 preferably communicate with one another using a network bus 132. Network bus 132 preferably includes path 132(a), path 132(b), path 132(c), path 132(d), and path 132(e). For example, in one embodiment, device B 112(b) is coupled to device A 112(a) via path 132(a), and to root device 114 via path 132(b). Similarly, root device 114 is coupled to device C 112(c) via path 132(c), and to device D 112(d) via path 132(d). In addition, device D 112(d) is coupled to device E 112(e) via path 132(e). In the FIG. 1 embodiment, network bus 132 is preferably implemented using an IEEE Std 1394 Standard for a High Performance Serial Bus, which is hereby incorporated by reference. However, in alternate embodiments, network 110 may readily communicate and function using various other network interconnectivity methodologies which are equally within the scope of the present invention.

In the FIG. 1 embodiment, each device in electronic network 110 may preferably communicate with any other device within network 110. For example, device E 112(e) may communicate with device B 112(b) by transmitting transfer data via cable 132(e) to device D 112(d), which then may transmit the transfer data via cable 132(d) to root device 114. In response, root device 114 then may transmit the transfer data to device B 112(b) via cable 132(b). In the FIG. 1 embodiment, root device 114 preferably provides a master cycle start signal to synchronize isochronous processes for devices 112 in network 110. In other embodiments of network 110, any one of the network devices 112 may be designated as the root device or cycle master.

Figure 2:
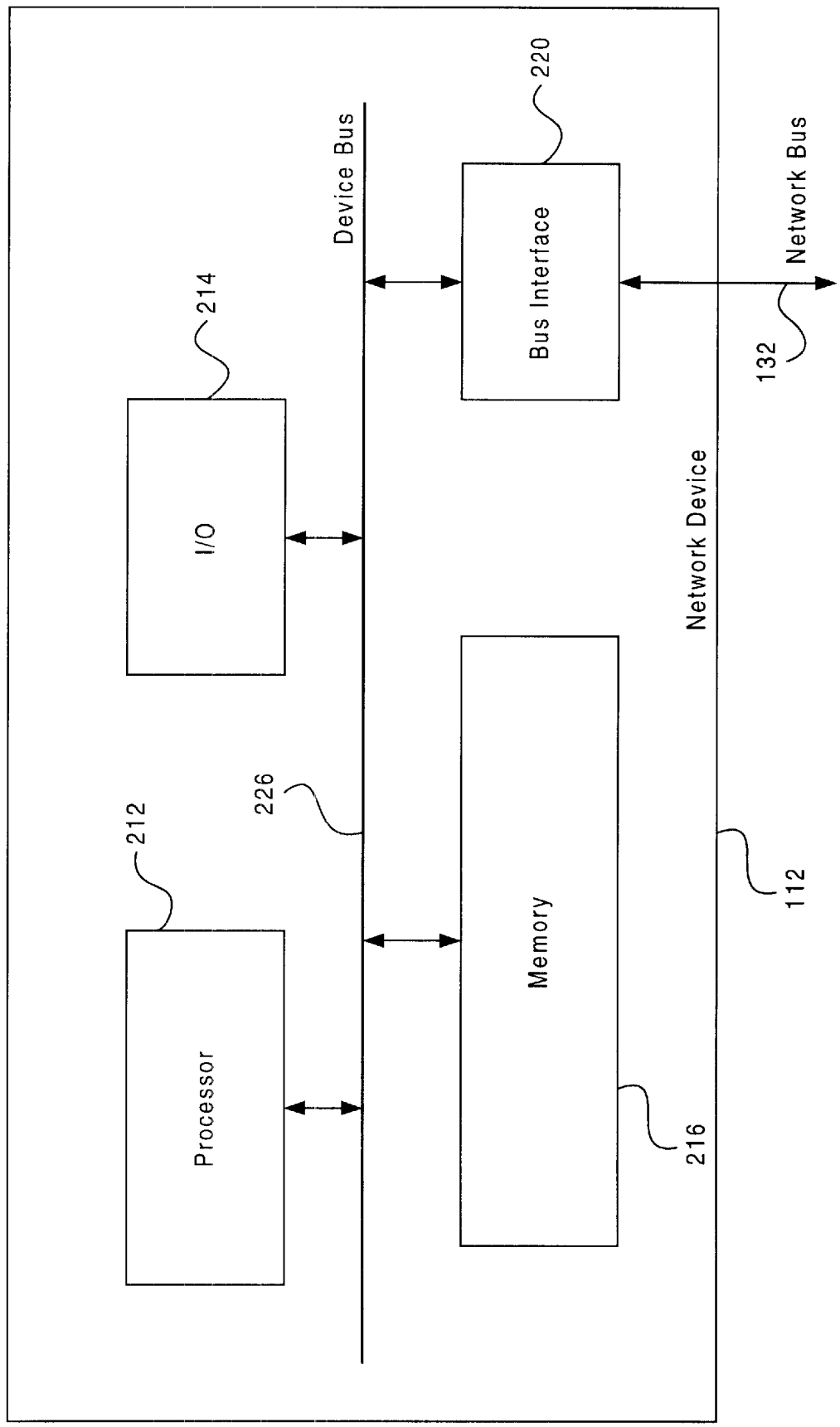
FIG. 2 is a block diagram for one embodiment of an exemplary device of FIG. 1, in accordance with the present invention.

Referring now to FIG. 2, a block diagram for one embodiment of an exemplary device 112 from network 110 is shown, in accordance with the present invention. Device 112 preferably includes, but is not limited to, a processor 212, an input/output (I/O) interface 214, a memory 216, a device bus 226, and a bus interface 220. Processor 212, I/O interface 214, memory 216 and bus interface 220 preferably are each coupled to, and communicate via common device bus 226.

In the FIG. 2 embodiment, processor 212 may be implemented as any appropriate multipurpose microprocessor device. Memory 216 may be implemented as one or more appropriate storage devices, including, but not limited to, read-only memory, random-access memory, and various types of non-volatile memory, such as floppy disc devices or hard disc devices. I/O interface 214 preferably may provide an interface for communications with various compatible sources and/or destinations.

In accordance with the present invention, bus interface 220 preferably provides an interface between device 112 and network 110. In the FIG. 2 embodiment, bus interface 220 preferably communicates with other devices 112 on network 110 via network bus 132. Bus interface 220 also preferably communicates with processor 212, I/O device 214, and memory 216 via a common device bus 226.

In the FIG. 2 embodiment, device 112 preferably includes the capability to perform various tasks that involve isochronous data and isochronous processes. Isochronous data typically includes information that is time-sensitive, and therefore requires deterministic operations to guarantee delivery and processing of the isochronous data in a timely manner. For example, video data that is intended for immediate display must arrive at the appropriate destination in a timely manner in order to prevent jitter or breakup of the corresponding image during display. To achieve this goal, device 112 preferably performs isochronous and other types of processing in segments of time called "cycles".

Scheduling of isochronous processes typically requires a finite time period that is sometimes referred to as "overhead". As the cycle time period is reduced, the overhead becomes a more significant factor because of the reduced amount of time remaining to perform the actual isochronous transfer. In the FIG. 2 embodiment, the cycle time period may be in the proximity of 125 microseconds, with a cycle frequency of approximately eight kilohertz.

Figure 3:
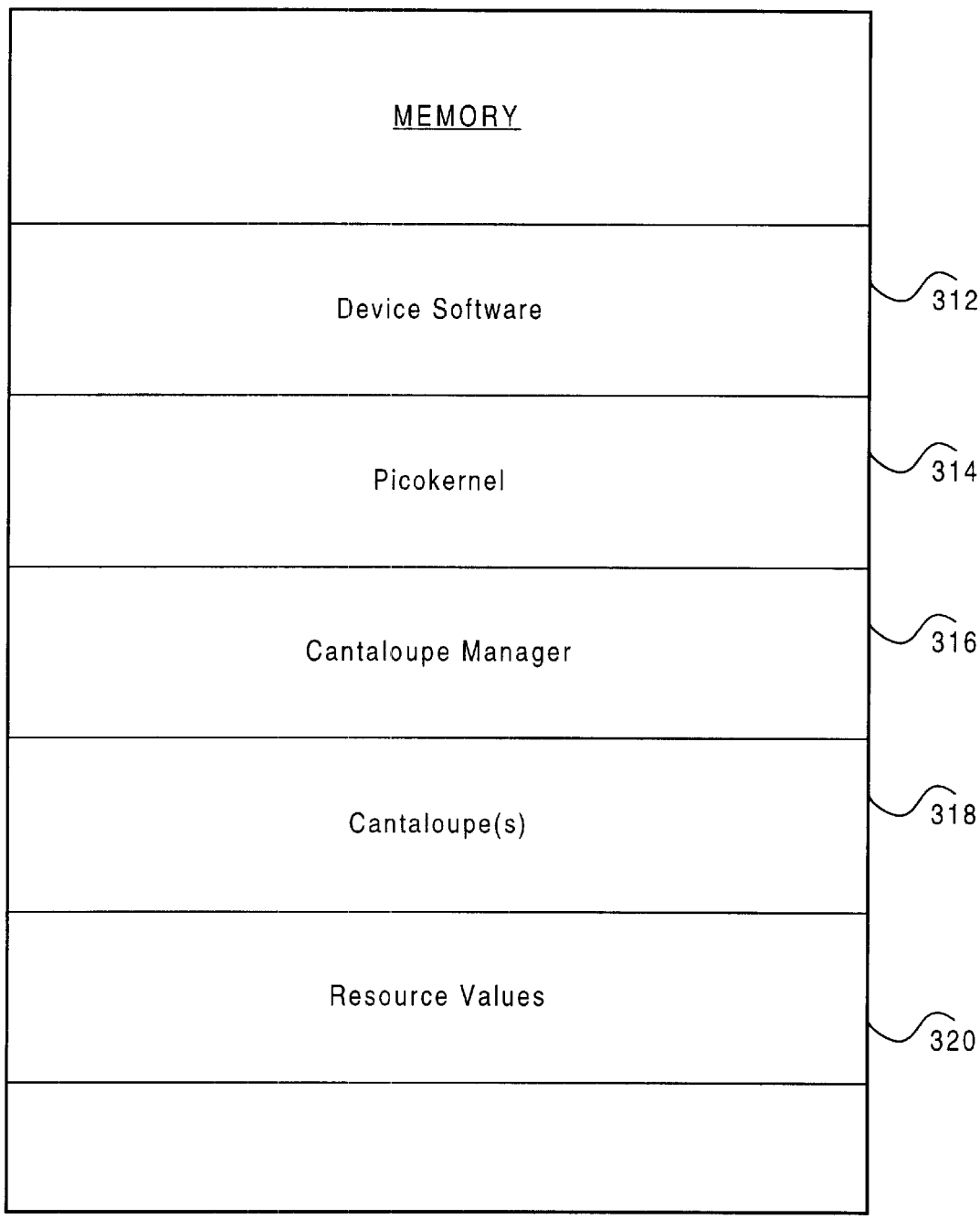
FIG. 3 is a diagram for one embodiment of the memory of FIG. 2, in accordance with the present invention.

Referring now to FIG. 3, a diagram for one embodiment of the FIG. 2 memory 216 is shown, in accordance with the present invention. In the FIG. 3 embodiment, memory 216 preferably includes, but is not limited to, device software 312, picokernel 314, cantaloupe manager 316, cantaloupe(s) 318, and resource values 320. In alternate embodiments, memory 216 may readily include various other components in addition to, or instead of, the components that are discussed in conjunction with the FIG. 3 embodiment.

In the FIG. 3 embodiment, device software 312 includes software instructions that are preferably executed by processor 212 for performing various functions and operations by device 112. The particular nature and functionality of device software 312 preferably varies depending upon factors such as the type and purpose of the corresponding host device 112.

In the FIG. 3 embodiment, picokernel 312 preferably controls and coordinates the scheduling of isochronous processes by utilizing an optimized process representation to reduce the cost or overhead of scheduling to a minimum. Cantaloupe manager 316 preferably includes an allocation manager that may utilize information from cantaloupe(s) 318 to determine whether a particular isochronous process may be instantiated on behalf of another entity, such as device software 312. Cantaloupe(s) 318 preferably comprise a resource characterization that includes one or more characterizations of hardware and/or software resources necessary to meet performance criteria for a particular isochronous process. Cantaloupe(s) 318 are further discussed below in conjunction with FIGS. 5 through 7.

Resource values 320 preferably include any relevant information regarding current resource availability and allocations in device 112. For example, in the FIG. 3 embodiment, resource values 320 may include one or more available resource value(s), one or more allocated resource value(s), and one or more total device resource value(s) for device 112. In the FIG. 3 embodiment, prior to allocation of any resources, the available resource value(s) may initially be set to a value that is less than 100% of total device resource values (such as 75%) to thereby reserve resources necessary for non-isochronous processes or system tasks.

Figure 4:
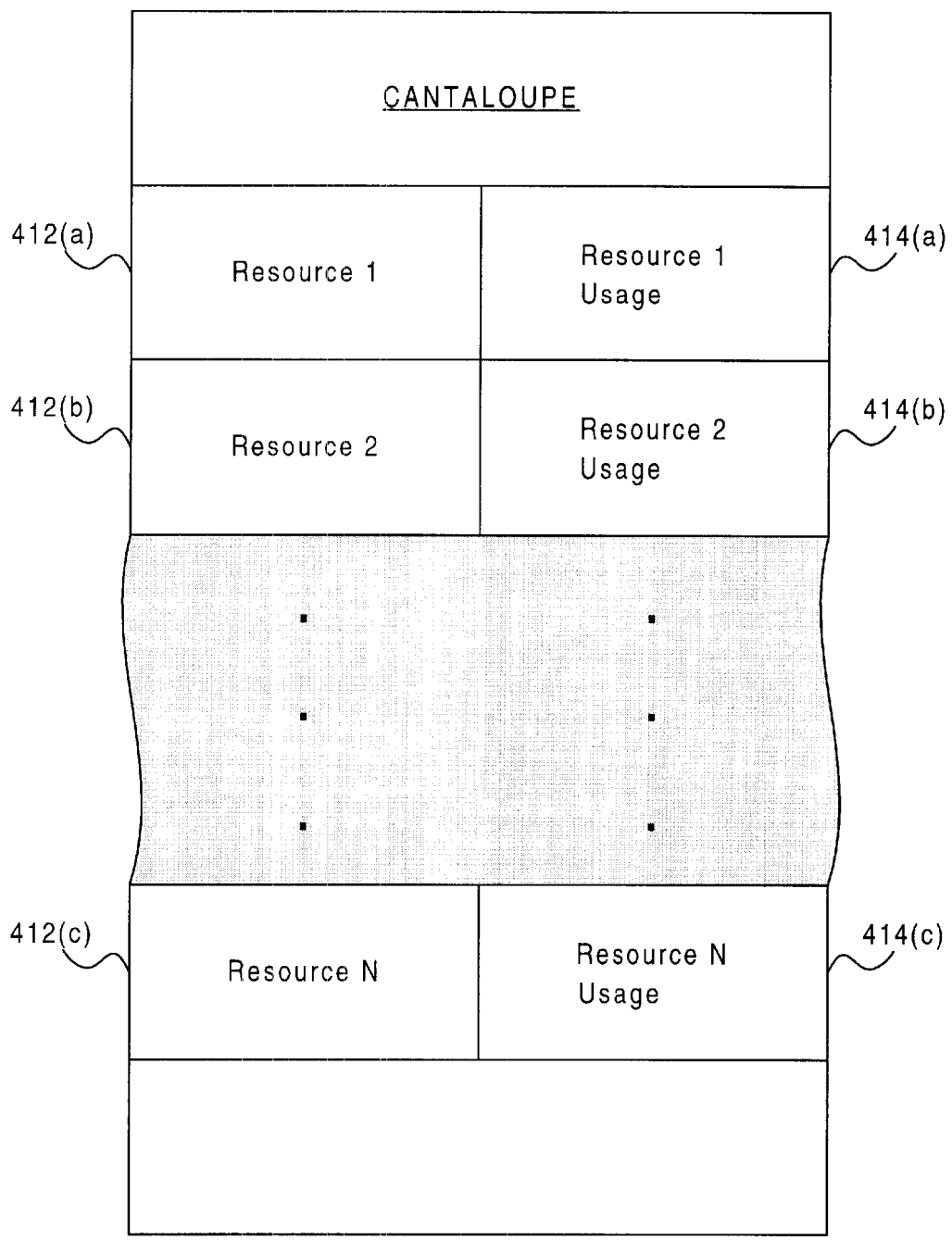
FIG. 4 is a block diagram for one embodiment of a cantaloupe, in accordance with the present invention.

Referring now to FIG. 4, a diagram for one embodiment of a cantaloupe 318 is shown, in accordance with the present invention. In the FIG. 4 embodiment, cantaloupe 318 preferably includes a listing for a resource 1 (412($a$)) through a listing for a resource N (412($c$)). In the FIG. 4 embodiment, resources 412 may include any appropriate aspects of devices 112 or network 110 (FIG. 1). For example, resource 412 may correspond to the bandwidth for a particular bus, such as device bus 226 or network bus 132. Similarly, resource 412 may correspond to the processing capacity for a central processing device, such as processor 212 (FIG. 2), or to the capacity of a memory device, such as memory 216. In alternate embodiments of the present invention, cantaloupe 318 may readily be implemented to include various other configurations, and may also include various items and components that are different from those discussed in conjunction with the FIG. 4 embodiment.

In accordance with the present invention, cantaloupe 318 is preferably associated with a particular time-sensitive isochronous or plesiochronous process on network 110. Prior to instantiating the foregoing process, cantaloupe manager 316 may then advantageously reference cantaloupe 318 to determine the individual and total resources necessary for the associated process. Determining in advance whether sufficient system resources are available for successful operation of a given process ensures that the associated isochronous process is guaranteed sufficient resources for timely and deterministic performance. Providing sufficient resources becomes more significant as the cycle duration decreases and the cycle frequency increases.

In the FIG. 4 embodiment, cantaloupe 318 preferably also includes a listing for a resource 1 usage (414($a$)) through a listing for a resource N usage (414($c$)). In the FIG. 4 embodiment, each of resource usages 414 preferably corresponds with a given resource 412 to characterize the amount of the given resource 412 required by the isochronous or plesiochronous process associated with cantaloupe 318.

For example, if a given resource 412 is the bandwidth for a particular bus, then the corresponding resource usage 414 may be expressed in bandwidth units utilized by a process. Similarly, if a given resource 412 is the processing capacity for a central processing device, then corresponding resource usage 414 may be expressed in CPU units, such as machine-instructions per second (MIPS). In various embodiments of the present invention, resource usages 414 may be implemented in any appropriate and compatible format for use by network 110, including a percentage value, or a native format that is directly compatible with certain other components. In one embodiment, cantaloupe 318 may be implemented using only resource usages 414, with the corresponding resources 412 indirectly implied and understood during instantiation of process on network 110. In certain embodiments, cantaloupe 318 may also be utilized to characterize other resources, such as the total system resources, or the current available resources of device 112.

Therefore, in the FIG. 4 embodiment, cantaloupe 318 preferably includes an at least two-dimensional array of descriptive parameters. The first parameter preferably may be the type of resource being characterized, and the second parameter is the amount of required resource usage. A cantaloupe 318 may thus serve as a common descriptor to couple hardware and software scheduling mechanisms by describing resource requirements. For example, resource usage may be characterized and described as a ratio of the amount of usage per a given time period (including process scheduling overhead).

Figure 5:
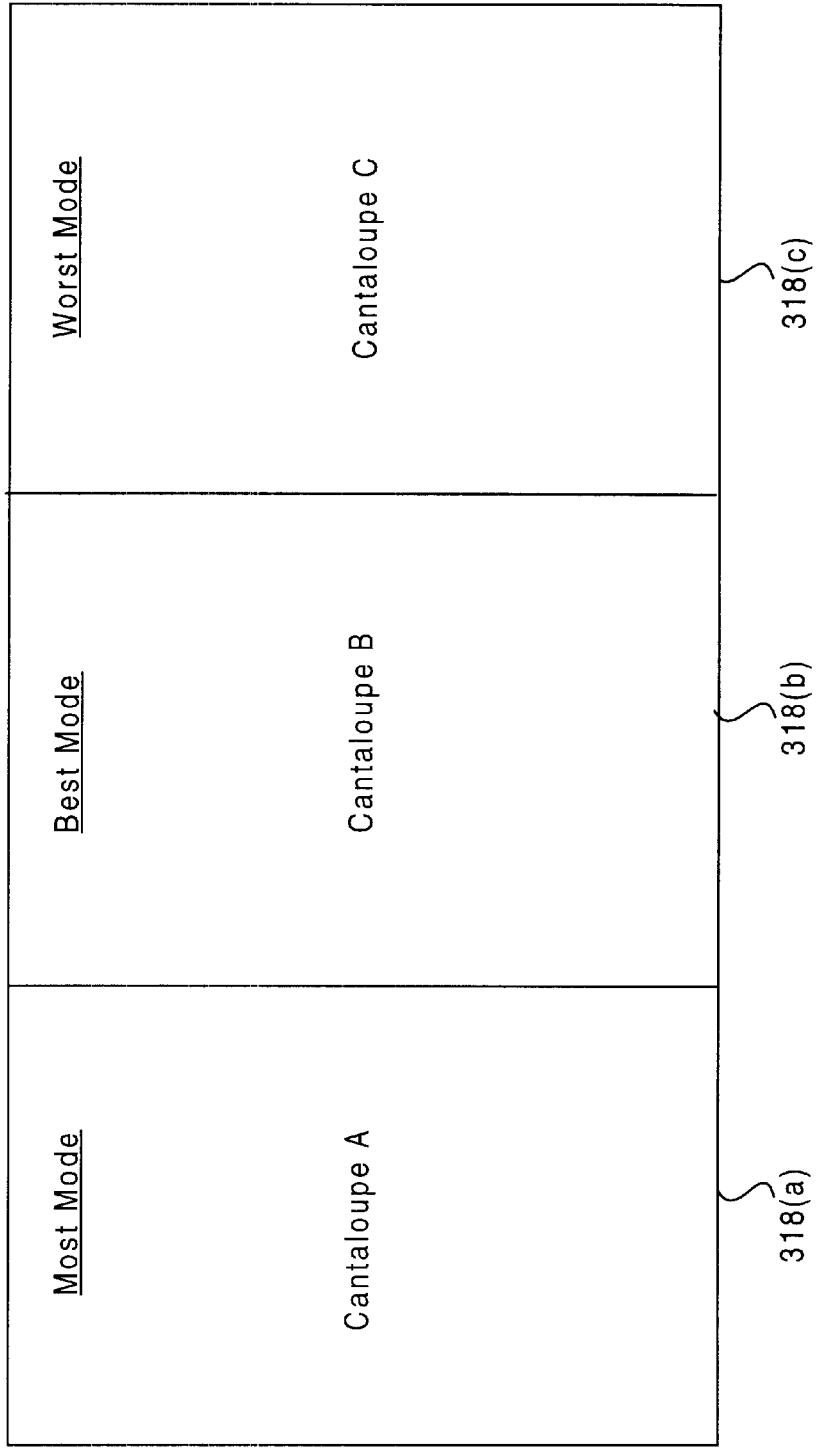
FIG. 5 is a block diagram for one embodiment of selectable resource modes, in accordance with the present invention.

Referring now to FIG. 5, a diagram for one embodiment of a cantaloupe set 512 is shown, in accordance with the present invention. In the FIG. 5 embodiment, cantaloupe set 512 preferably includes, but is not limited to, a cantaloupe A 318($a$) corresponding to a "most" mode, a cantaloupe B 318($b$) corresponding to a "best" mode, and a cantaloupe C 318($c$) corresponding to a "worst" mode. In alternate embodiments, cantaloupe set 512 may readily include various cantaloupes and modes in addition to, or instead of, those discussed in conjunction with the FIG. 5 embodiment.

In the FIG. 5 embodiment, the most mode of cantaloupe A 318(a) preferably includes a characterization of resource usages 414 through which a particular process may achieve optimal performance. However, the most mode of cantaloupe A 318(a) typically utilizes a high degree of system resources. In contrast, the worst mode of cantaloupe C 318(c) preferably includes a characterization of resource usages 414 through which a particular process may achieve a somewhat degraded performance. However, the worst mode of cantaloupe C 318(c) typically utilizes a low degree of system resources.

In addition, the best mode of cantaloupe B 318(b) preferably includes a characterization of resource usages 414 through which a particular process may achieve an acceptable, but not optimal, performance. The best mode of cantaloupe B 318(b) typically utilizes a moderate amount of system resources. A node in network 110 that is seeking to instantiate an isochronous process (for example, to transfer and process isochronous data) may thus intelligently select a particular mode from cantaloupe set 512 to efficiently allocate resources, depending upon factors such as current device conditions and/or the relative importance of the particular requested isochronous process.

In one embodiment, cantaloupe manager 316 may initially compare the resource characterizations in cantaloupe A 318(a) (most mode) with available resources for the requested process. If sufficient resources are unavailable for the most mode, then cantaloupe manager 316 may compare the resource characterizations in cantaloupe B 318(b) (best mode) with available resources for the requested process. If sufficient resources are still unavailable for the most mode, then cantaloupe manager 316 may compare the resource characterizations in cantaloupe C 318(c) (worst mode) with available resources for the requested process. If sufficient resources are still unavailable for the worst mode, then cantaloupe manager 316 may return a request fail signal to the requesting node.

Figure 6:
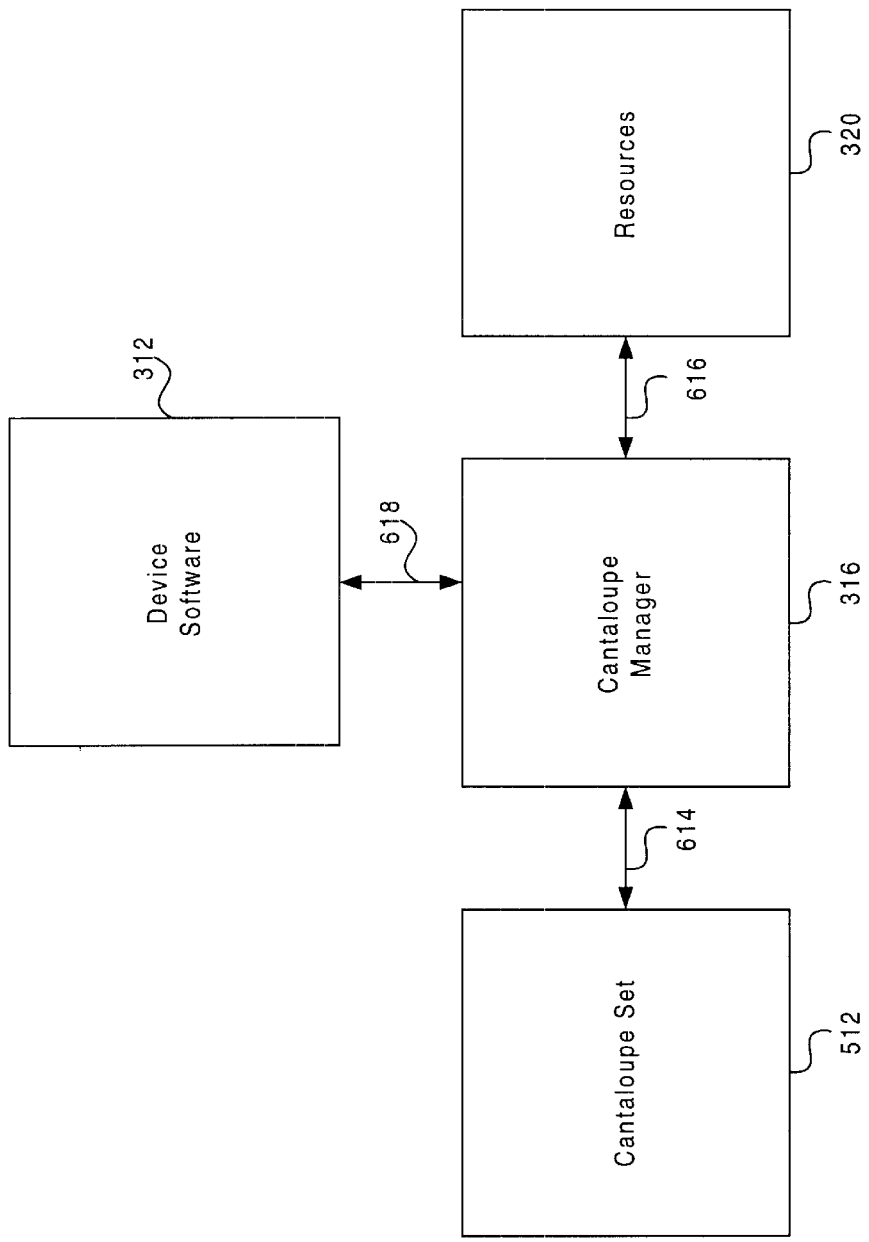
FIG. 6 is a block diagram that illustrates a resource allocation procedure, in accordance with one embodiment of the present invention.

Referring now to FIG. 6, a block diagram for performing a resource allocation procedure with a cantaloupe set 512 is shown, in accordance with one embodiment of the present invention. In alternate embodiments, cantaloupe set 512 may readily be utilized in various other manners and configurations, in accordance with the present invention.

In the FIG. 6 embodiment, device software 312 initially generates an isochronous process request to cantaloupe manager 316 via path 618. In response, cantaloupe manager 316 preferably accesses and examines cantaloupe set 512 via path 614. In the FIG. 6 embodiment, cantaloupe set 512 preferably corresponds to the foregoing isochronous process that was initially requested by device software 312.

In certain embodiments, device software 312 may identify a resource usage mode as part of the isochronous process request to designate a particular cantaloupe 318 in cantaloupe set 512. In such embodiments, the specified resource usage mode may be selected by device software 312 or any other entity (such as cantaloupe manager 316) depending upon any relevant or appropriate factors. For example, selection of the resource usage mode may be based upon the particular nature of the requested process, the amount of currently-available resources, or the level of performance quality desired by users of device 112. Cantaloupe set 512 therefore advantageously provides resource characterizations that are dynamically selectable depending upon design considerations and current conditions in device 112.

Cantaloupe manager 316 then preferably compares the resource usages 514 from the selected cantaloupe 318 in cantaloupe set 512 with currently-available resources 320 via path 616. In the FIG. 6 embodiment, cantaloupe manager 316 may sequentially or concurrently compare each individual resource usage 514 from cantaloupe 318 with a corresponding currently-available associated system resource 320.

If sufficient unallocated resources 320 are available for the requested isochronous process, then cantaloupe manager 316 preferably authorizes device software 312 to schedule and instantiate the requested process through picokernel 314. However, if sufficient current resources 320 are not available for the requested isochronous process, then cantaloupe manager 316 may generate a request fail signal to device software 312 to deny authorization of the requested isochronous process.

In certain embodiments, cantaloupe manager 316 may access cantaloupe set 512 to perform a hierarchical examination process to thereby encourage high-quality performance while still attempting to permit authorization of the requested isochronous process. For example, in the foregoing hierarchical examination process, cantaloupe manger 316 may initially evaluate the most mode of cantaloupe set 512. In the event that sufficient currently-available resources 320 are not present to successfully execute the most mode, cantaloupe manager 316 may then preferably evaluate the best mode of cantaloupe set 512.

Again, if sufficient currently-available resources 320 are not present to successfully execute the best mode, then cantaloupe manager 316 preferably may evaluate the worst mode. In the event that sufficient currently-available resources 320 are still not present to successfully execute the worst mode, then the cantaloupe manger 316 preferably generates a request fail signal to device software 312 to thereby deny authorization of the requested isochronous process. The foregoing hierarchical examination process is further discussed below in conjunction with FIG. 8.

In this manner, the present invention advantageously pre-allocates sufficient resources for a given isochronous process, prior to instantiation, to thereby guarantee successful and deterministic performance of the isochronous process.

Figure 7:
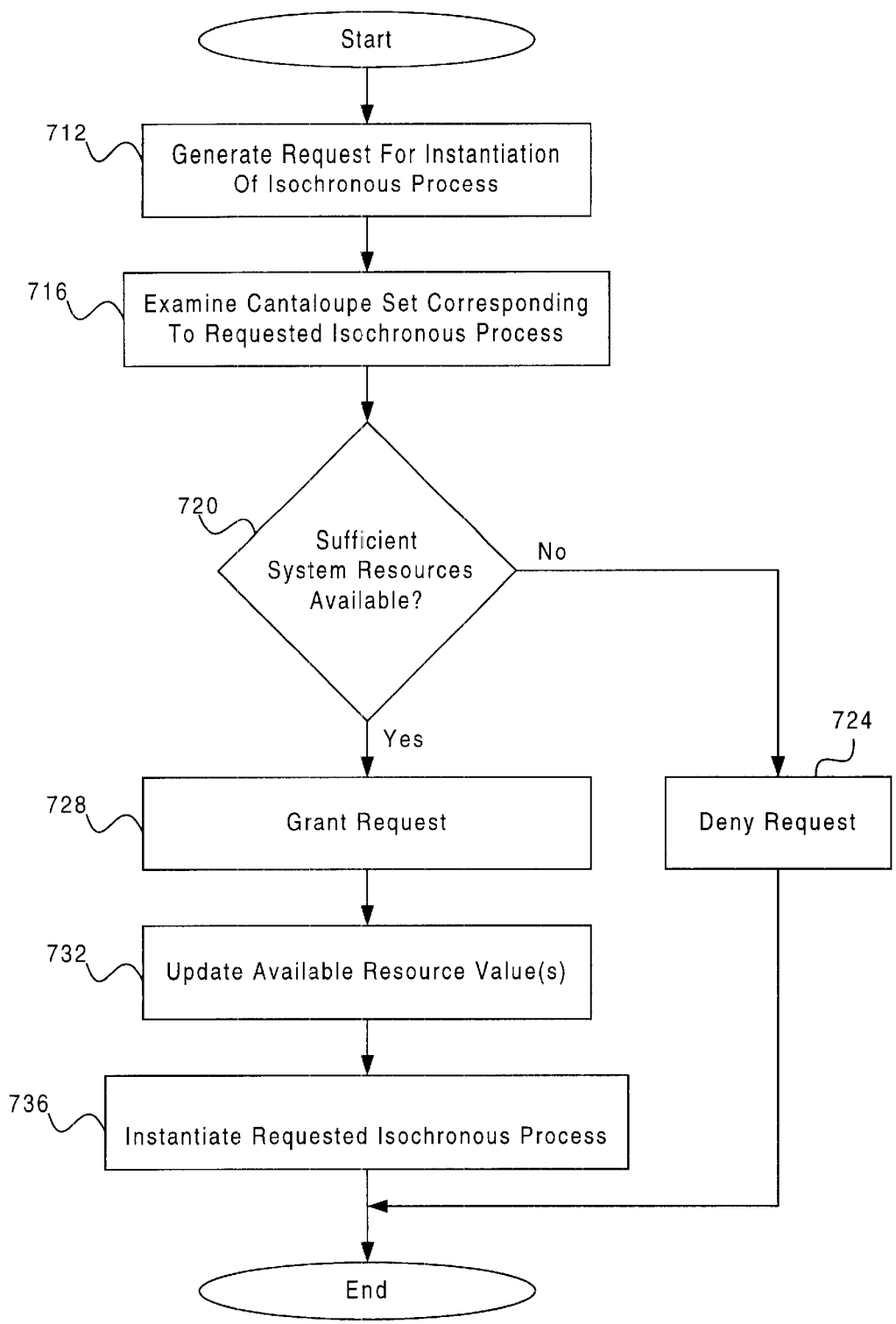
FIG. 7 is a flowchart of method steps for performing a resource allocation procedure, in accordance with one embodiment of the present invention.

Referring now to FIG. 7, a flowchart of method steps for performing a resource allocation procedure is shown, in accordance with one embodiment of the present invention. In alternate embodiments, the FIG. 7 resource allocation procedure may readily be performed in various other manners and sequences, in accordance with the present invention.

In the FIG. 7 embodiment, initially, in step 712, an entity (such as device software 312) preferably generates a request for instantiation of an isochronous process. In response, in step 716, cantaloupe manager 316 preferably examines the cantaloupe set 512 that corresponds to the requested isochronous process. In the FIG. 7 embodiment, device software 312 preferably may specify a resource usage mode as part of the isochronous process request to designate a particular cantaloupe 318 within cantaloupe set 512.

In step 720, cantaloupe manager 316 preferably determines whether sufficient resources are currently available for performing the requested isochronous process. In accordance with the present invention, cantaloupe manager 316 may utilize any appropriate technique to determine whether sufficient resources are available for performing the requested process.

In the FIG. 7 embodiment, cantaloupe manager 316 preferably maintains one or more available resource values in resource values 320 of memory 216 (FIG. 3) to quantitatively represent any currently unallocated resources. For example, available resource values may be expressed as percentages of total system resources, or as a finite resource amount. Cantaloupe manager 316 may then compare the resources required for the requested process (obtained from cantaloupe(s) 318) and the currently-available resource value(s) to determine whether sufficient unallocated resources are available for utilization by the requested process.

In step 720, if cantaloupe manager 316 determines that sufficient resources are not available for performing the requested process, then, in step 724, cantaloupe manager 316 preferably denies the request for instantiation of the process, and the FIG. 7 method terminates. However, if cantaloupe manager 316 determines that sufficient resources are available for performing the requested process, then, in step 728, cantaloupe manager 316 preferably allocates the required resources, and grants the request for instantiation of the isochronous process.

In step 732, cantaloupe manager 316 preferably updates the available resource value(s) in memory 216 to include the resources that were allocated in foregoing step 728 for servicing the requested isochronous process. For example, if the requested process requires twenty-five percent of system resources, then, cantaloupe manager 316 preferably may decrease the available resource value in memory 216 by twenty-five percent. Finally, in step 736, picokernel 314 of device 112 preferably may instantiate and execute the requested isochronous process. The resources that are allocated for the isochronous process are therefore guaranteed to be available, and the isochronous process is thus assured of successful execution. In accordance with the present invention, the FIG. 7 process may readily be utilized to evaluate a series of requested isochronous processes.

Figure 8:
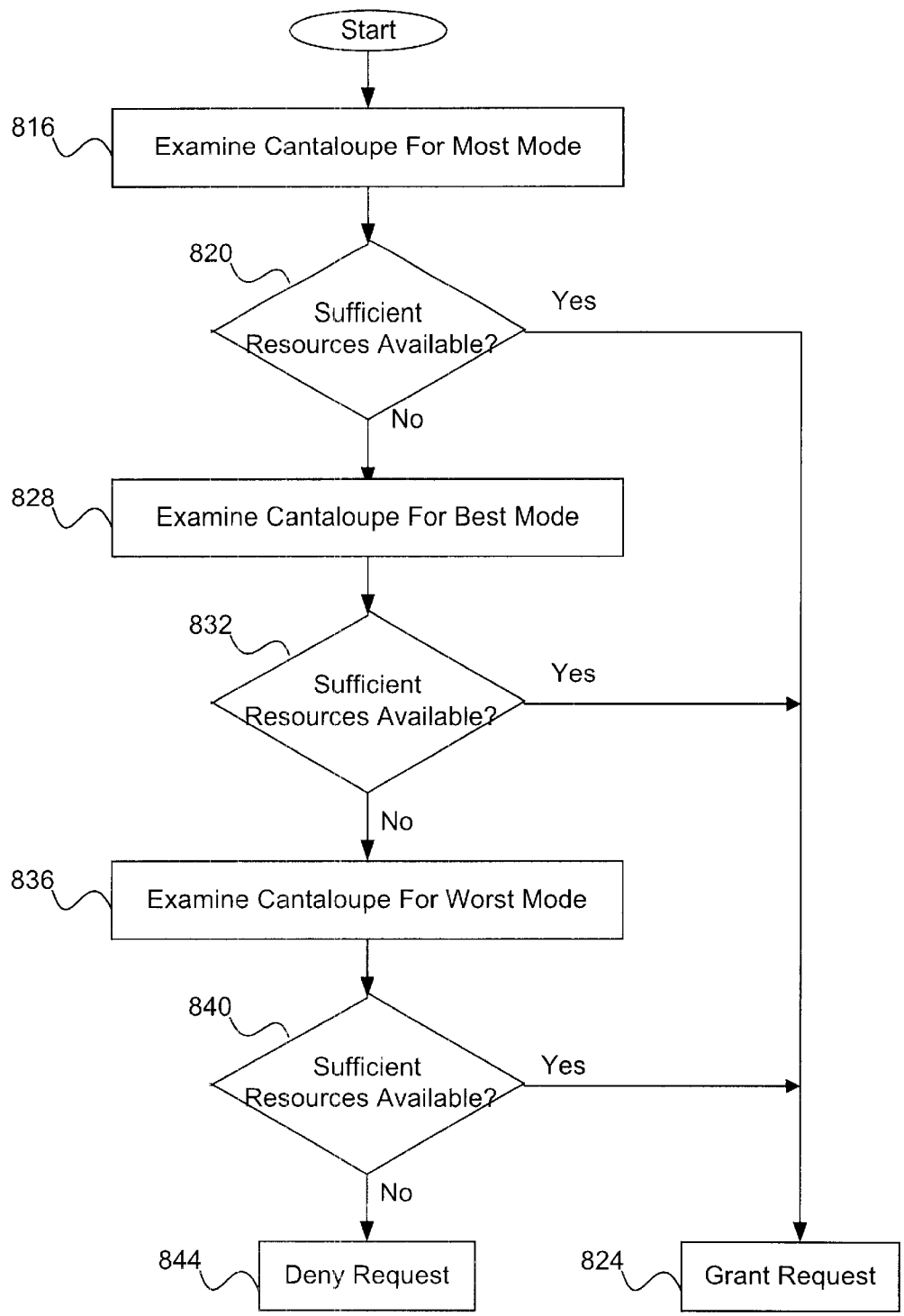
FIG. 8 is a flowchart of method steps for utilizing selectable resource modes, in accordance with one embodiment of the present invention.

Referring now to FIG. 8, a flowchart of method steps for utilizing selectable resource modes is shown, in accordance with one embodiment of the present invention. In certain embodiments, the method steps of the FIG. 8 embodiment may replace steps 716, 720, 724, and 728 of FIG. 7. In addition, the FIG. 8 embodiment may readily be implemented using various sequences and steps in addition to, or instead of, those discussed in conjunction with the FIG. 8 embodiment. For example, the present invention may readily examine a cantaloupe set 512 that includes a greater or lesser number of resource usage modes than those shown in the cantaloupe set 512 of FIG. 5.

In the FIG. 8 embodiment, in step 816, cantaloupe manager 316 preferably may access and examine the most mode (cantaloupe 318(*a*) of FIG. 5) of cantaloupe set 512. Then, in step 820, cantaloupe manager 316 preferably may determine whether sufficient resources are available to perform the requested process, as discussed above in conjunction with FIG. 7. If sufficient resources are available for the most mode, then, in step 824, cantaloupe manager 316 preferably may grant the process request.

However, if sufficient resources are not available in foregoing step 820 to perform the requested process using the most mode, then, in step 828, cantaloupe manager 316 preferably may examine the best mode (cantaloupe 318(*b*) of FIG. 5) of cantaloupe set 512. In step 832, cantaloupe manager 316 preferably may then determine whether sufficient resources are available to perform the requested process using the best mode of cantaloupe set 512. If sufficient resources are available for the best mode, then cantaloupe manager 316 preferably may grant the process request in step 824.

If sufficient resources are not available in foregoing step 832 to perform the requested process using the best mode, then, in step 836, cantaloupe manager 316 may examine the worst mode (cantaloupe 318(*c*) of FIG. 5) of cantaloupe set 512. In step 840, cantaloupe manager 316 preferably may then determine whether sufficient resources are available to perform the requested process using the worst mode of cantaloupe set 512. If sufficient resources are available, then cantaloupe manager 316 preferably may grant the process request in step 824.

However, if sufficient resources are still not available in foregoing step 840 to perform the requested process using the worst mode, then, in step 844, in accordance with the present invention, cantaloupe manager 316 preferably may deny the request from device software 312 for instantiation of the isochronous process.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for selectively allocating resources in an electronic device, comprising:

a resource characterization set coupled to said electronic device, said resource characterization set corresponding to a requested process, said requested process including one or more time-sensitive isochronous processes for manipulating time-critical isochronous data;

a software module configured to generate a process request to instantiate said requested process on said electronic device, said process request including an identifier that corresponds to a specific resource characterization from said resource characterization set;

an allocation manager configured to handle said requested process by referencing said resource characterization set, said resource characterization set including a plurality of resource characterizations that each include resource requirements for executing said requested process, said plurality of resource characterizations including a most mode, a best mode, and a worst mode, said allocation manager selecting said resource requirements from one or more of said most mode, said best mode, and said worst mode, and comparing said resource requirements to currently-available resources, said allocation manager thereby authorizing said requested process only when said resource requirements are less than, or equal to, said currently-available resources; and a processor coupled to said electronic device for controlling said allocation manager.

2. The system of claim 1, wherein said electronic device is coupled to an electronic network that is implemented according to an IEEE Std 1394 serial bus interconnectivity standard.

3. The system of claim 1 wherein said electronic device is one of a consumer-electronics device, an audio-visual device, a set-top box, and a personal computer device.

4. The system of claim 1 wherein said allocation manager evaluates a resource characterization from said resource characterization set in response to said process request from said software module.

5. The system of claim 4 wherein said resource characterization includes one or more resource listings and one or more corresponding resource usage values that are required for executing said requested process.

6. The system of claim 4 wherein said resource characterization includes a most mode that provides an optimal performance quality for said requested process and utilizes a substantial amount of said resources.

7. The system of claim 4 wherein said resource characterization includes a best mode that provides an average performance quality for said requested process and utilizes a moderate amount of said resources.

8. The system of claim 4 wherein said resource characterization includes a worst mode that provides a minimum acceptable performance quality for said requested process and utilizes a reduced amount of said resources.

9. The system of claim 4 wherein said allocation manager compares resource usage values from said resource characterization and currently-available resource values to determine whether to authorize said requested process.

10. A system for selectively allocating resources in an electronic device, comprising:

a resource characterization set coupled to said electronic device, said resource characterization set corresponding to a requested process;

an allocation manager configured to handle said requested process by referencing said resource characterization set; and a processor coupled to said electronic device for controlling said allocation manager, wherein a software module generates a process request to instantiate said requested process on said electronic device, wherein said allocation manager evaluates a resource characterization from said resource characterization set in response to said process request from said software module, wherein said allocation manager compares resource usage values from said resource characterization and currently-available resource values to determine whether to authorize said requested process, and wherein said allocation manager authorizes said requested process whenever said resource usage values from said resource characterization are less than or equal to said currently-available resource values.

11. A system for selectively allocating resources in an electronic device, comprising:

a resource characterization set coupled to said electronic device, said resource characterization set corresponding to a requested process;

an allocation manager configured to handle said requested process by referencing said resource characterization set; and a processor coupled to said electronic device for controlling said allocation manager, wherein a software module generates a process request to instantiate said requested process on said electronic device, wherein said allocation manager evaluates a resource characterization from said resource characterization set in response to said process request from said software module, wherein said allocation manager compares resource usage values from said resource characterization and currently-available resource values to determine whether to authorize said requested process, and wherein said allocation manager denies said requested process whenever said resource usage values from said resource characterization are greater than said currently-available resource values.

12. The system of claim 10 wherein said allocation manager updates said currently-available resource values with said resource usage values whenever said requested process is authorized by said allocation manager.

13. The system of claim 10 wherein a picokernel in said electronic device instantiates and executes said requested process after said allocation manager authorizes said requested process.

14. A system for selectively allocating resources in an electronic device, comprising:

a resource characterization set coupled to said electronic device, said resource characterization set corresponding to a requested process;

an allocation manager configured to handle said requested process by referencing said resource characterization set; and a processor coupled to said electronic device for controlling said allocation manager, wherein a software module generates a process request to instantiate said requested process on said electronic device, wherein said allocation manager evaluates a resource characterization from said resource characterization set in response to said process request from said software module, and wherein said allocation manager evaluates a most mode of said resource characterization set, and authorizes said requested process whenever said resource usage values from said most mode are less than or equal to currently-available resource values.

15. The system of claim 14 wherein said allocation manager evaluates a best mode of said resource characterization set whenever said resource usage values from said most mode are greater than said currently-available resource values, said allocation manager authorizing said requested process whenever said resource usage values from said best mode are less than or equal to said currently-available resource values.

16. The system of claim 15 wherein said allocation manager evaluates a worst mode of said resource characterization set whenever said resource usage values from said best mode are greater than said currently-available resource values, said allocation manager authorizing said requested process whenever said resource usage values from said worst mode are less than or equal to said currently-available resource values.

17. A method for selectively allocating resources in an electronic device, comprising the steps of:

generating a process request with a software module to instantiate a requested process on said electronic device, said process request including an identifier that corresponds to a specific resource characterization from a resource characterization set;

referencing said resource characterization set with an allocation manager, said resource characterization set corresponding to said requested process, said requested process including one or more time-sensitive isochronous processes for manipulating time-critical isochronous data;

handling said requested process with said allocation manager based upon said resource characterization set, said resource characterization set including a plurality of resource characterizations that each include resource requirements for executing said requested process, said plurality of resource characterizations including a most mode, a best mode, and a worst mode, said allocation manager selecting said resource requirements from one or more of said most mode, said best mode, and said worst mode, and comparing said resource requirements to currently-available resources, said allocation manager thereby authorizing said requested process only when said resource requirements are less than, or equal to, said currently-available resources; and controlling said allocation manager with a processor that is coupled to said electronic device.

18. The method of claim 17, wherein said electronic device is coupled to an electronic network that is implemented according to an IEEE Std 1394 serial bus interconnectivity standard.

19. The method of claim 17 wherein said electronic device is one of a consumer-electronics device, an audio-visual device, a set-top box, and a personal computer device.

20. The method of claim 17 wherein said allocation manager evaluates a resource characterization from said resource characterization set in response to said process request from said software module.

21. The method of claim 20 wherein said resource characterization includes one or more resource listings and one or more corresponding resource usage values that are required for executing said requested process.

22. The method of claim 20 wherein said resource characterization includes a most mode that provides an optimal performance quality for said requested process and utilizes a substantial amount of said resources.

23. The method of claim 20 wherein said resource characterization includes a best mode that provides an average performance quality for said requested process and utilizes a moderate amount of said resources.

24. The method of claim 20 wherein said resource characterization includes a worst mode that provides a minimum acceptable performance quality for said requested process and utilizes a reduced amount of said resources.

25. The method of claim 20 wherein said allocation manager compares resource usage values from said resource characterization and currently-available resource values to determine whether to authorize said requested process.

26. A method for selectively allocating resources in an electronic device, comprising:

referencing a resource characterization set with an allocation manager, said resource characterization set corresponding to a requested process;

handling said requested process with said allocation manager based upon said resource characterization set; and controlling said allocation manager with a processor that is coupled to said electronic device, wherein a software module generates a process request to instantiate said requested process on said electronic device, wherein said allocation manager evaluates a resource characterization from said resource characterization set in response to said process request from said software module, wherein said allocation manager compares resource usage values from said resource characterization and currently-available resource values to determine whether to authorize said requested process, and wherein said allocation manager authorizes said requested process whenever said resource usage values from said resource characterization are less than or equal to said currently-available resource values.

27. A method for selectively allocating resources in an electronic device comprising:

referencing a resource characterization set with an allocation manager, said resource characterization set corresponding to a requested process;

handling said requested process with said allocation manager based upon said resource characterization set; and controlling said allocation manager with a processor that is coupled to said electronic device, wherein a software module generates a process request to instantiate said requested process on said electronic device, wherein said allocation manager evaluates a resource characterization from said resource characterization set in response to said process request from said software module, wherein said allocation manager compares resource usage values from said resource characterization and currently-available resource values to determine whether to authorize said requested process, and wherein said allocation manager denies said requested process whenever said resource usage values from said resource characterization are greater than said currently-available resource values.

28. The method of claim 26 wherein said allocation manager updates said currently-available resource values with said resource usage values whenever said requested process is authorized by said allocation manager.

29. The method of claim 26 wherein a picokernel in said electronic device instantiates and executes said requested process after said allocation manager authorizes said requested process.

30. A method for selectively allocating resources in an electronic device, comprising:

referencing a resource characterization set with an allocation manager, said resource characterization set corresponding to a requested process;

handling said requested process with said allocation manager based upon said resource characterization set; and controlling said allocation manager with a processor that is coupled to said electronic device, wherein a software module generates a process request to instantiate said requested process on said electronic device, wherein said allocation manager evaluates a resource characterization from said resource characterization set in response to said process request from said software module, and wherein said allocation manager evaluates a most mode of said resource characterization set, and authorizes said requested process whenever said resource usage values from said most mode are less than or equal to currently-available resource values.

31. The method of claim 30 wherein said allocation manager evaluates a best mode of said resource characterization set whenever said resource usage values from said most mode are greater than said currently-available resource values, said allocation manager authorizing said requested process whenever said resource usage values from said best mode are less than or equal to said currently-available resource values.

32. The method of claim 31 wherein said allocation manager evaluates a worst mode of said resource characterization set whenever said resource usage values from said best mode are greater than said currently-available resource values, said allocation manager authorizing said requested process whenever said resource usage values from said worst mode are less than or equal to said currently-available resource values.

33. A computer-readable medium comprising program instructions for selectively allocating resources in an electronic device by performing the steps of:

generating a process request with a software module to instantiate a requested process on said electronic device, said process request including an identifier that corresponds to a specific resource characterization from a resource characterization set;

referencing said resource characterization set with an allocation manager, said resource characterization set corresponding to said requested process, said requested process including one or more time-sensitive isochronous processes for manipulating time-critical isochronous data;

handling said requested process with said allocation manager based upon said resource characterization set, said resource characterization set including a plurality of resource characterizations that each include resource requirements for executing said requested process, said plurality of resource characterizations including a most mode, a best mode, and a worst mode, said allocation manager selecting said resource requirements from one or more of said most mode, said best mode, and said worst mode, and comparing said resource requirements to currently-available resources, said allocation manager thereby authorizing said requested process only when said resource requirements are less than, or equal to, said currently-available resources; and controlling said allocation manager with a processor that is coupled to said electronic device.

34. A system for selectively allocating resources in an electronic device, comprising:

means for referencing a resource characterization set that corresponds to a requested process;

means for handling said requested process based upon said resource characterization set; and means for controlling said means for referencing and said means for handling.

* * * * *